Aug. 2, 1966  R. G. DOERFLING  3,263,884
STRIP PROCESSING MACHINE
Filed June 29, 1964  6 Sheets-Sheet 4
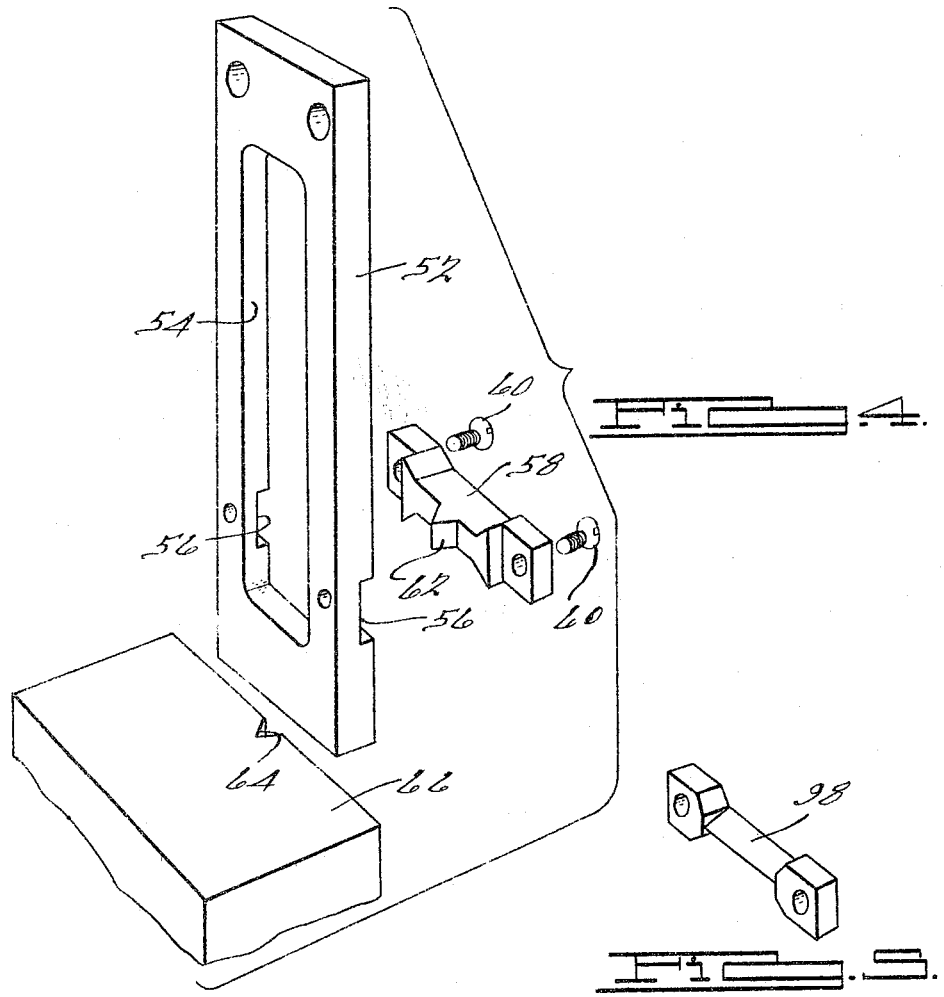
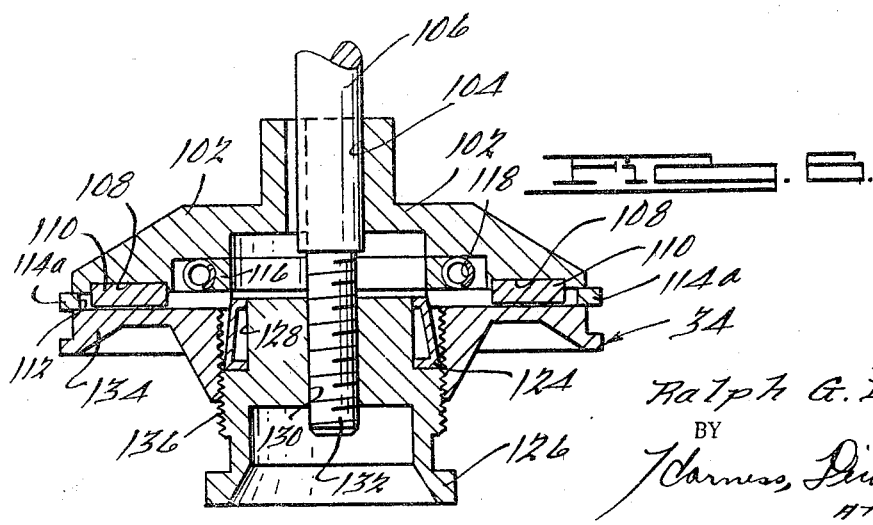
INVENTOR.
Ralph G. Doerfling
BY
Harness, Dickey & Pierce
ATTORNEYS.

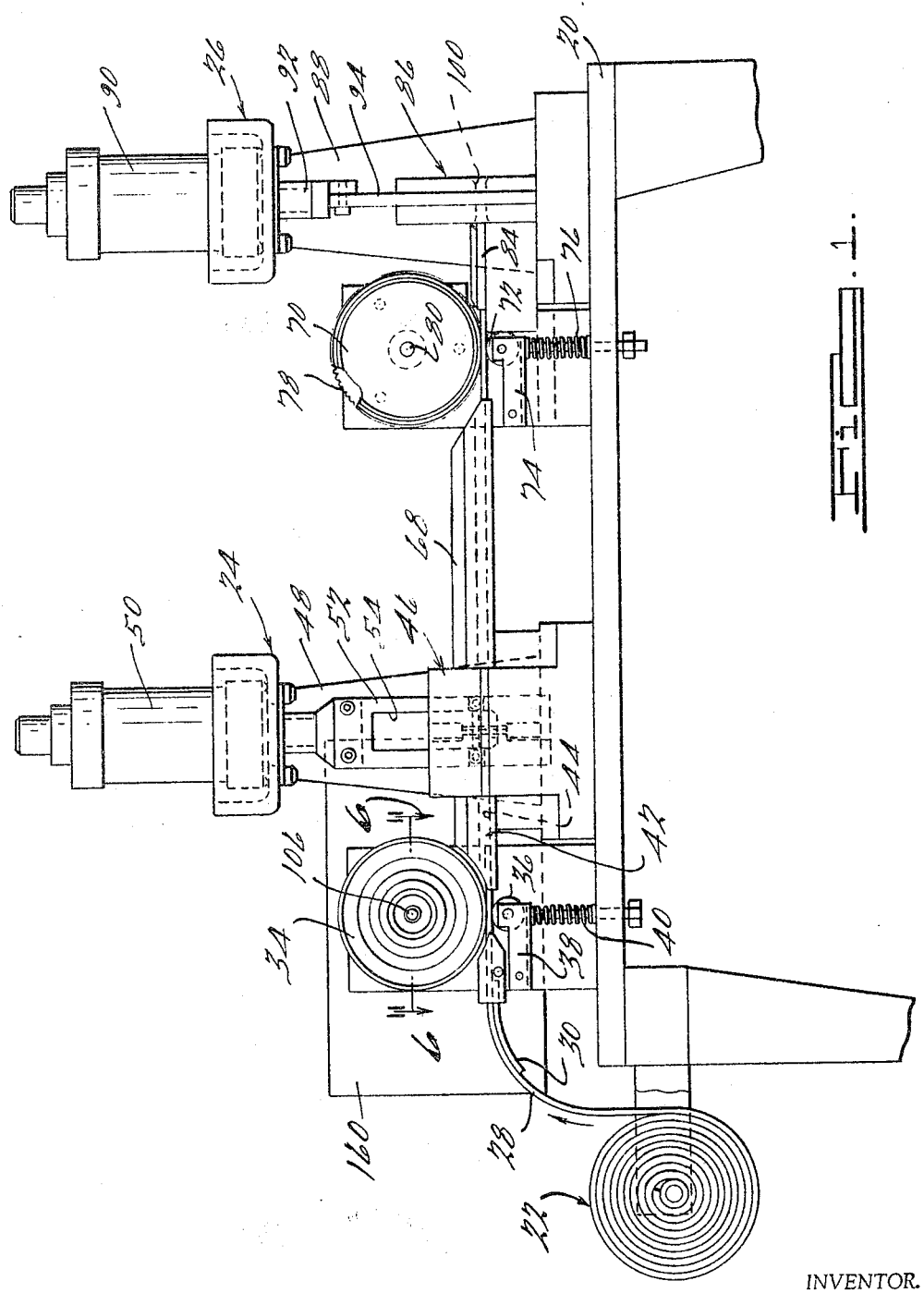

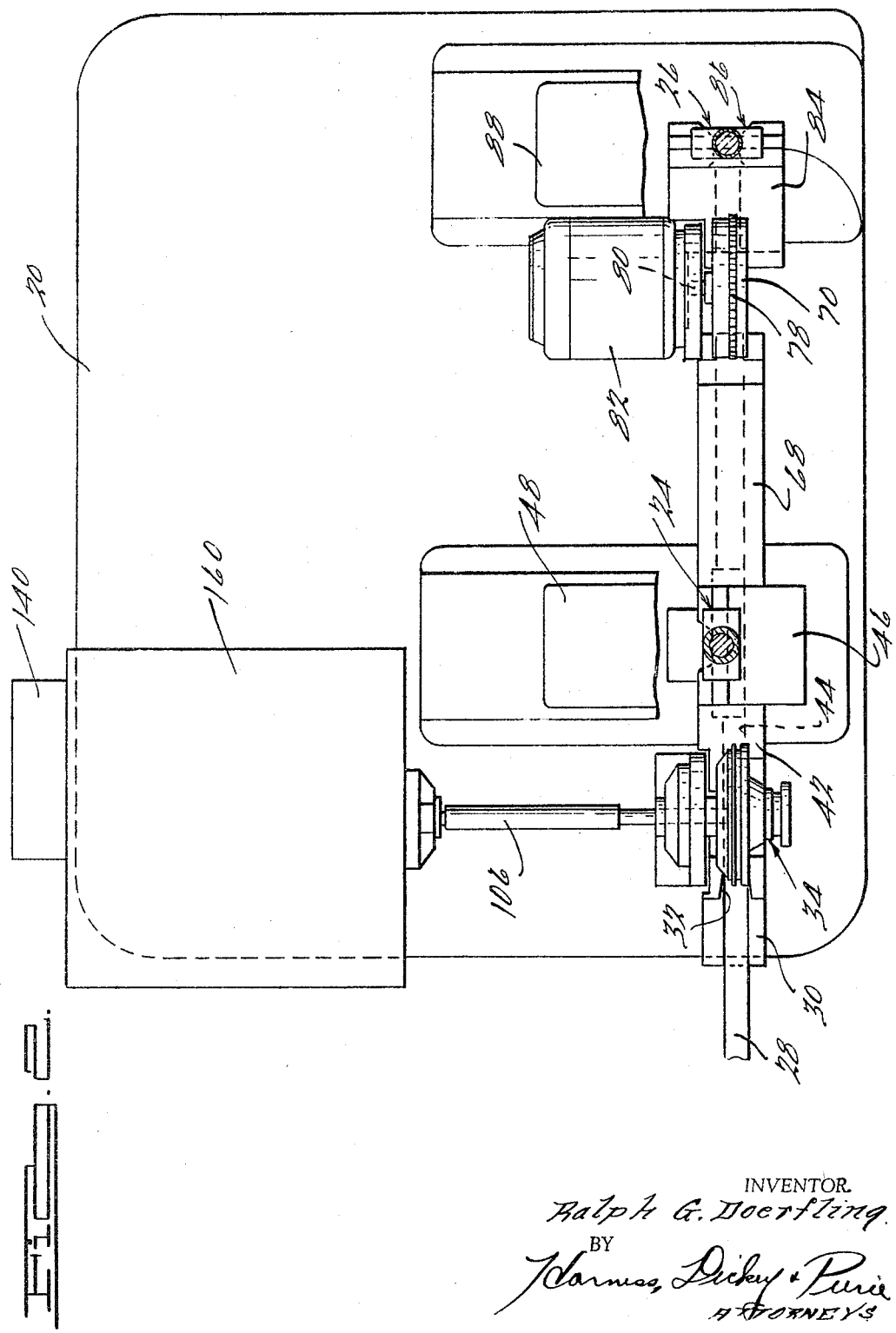

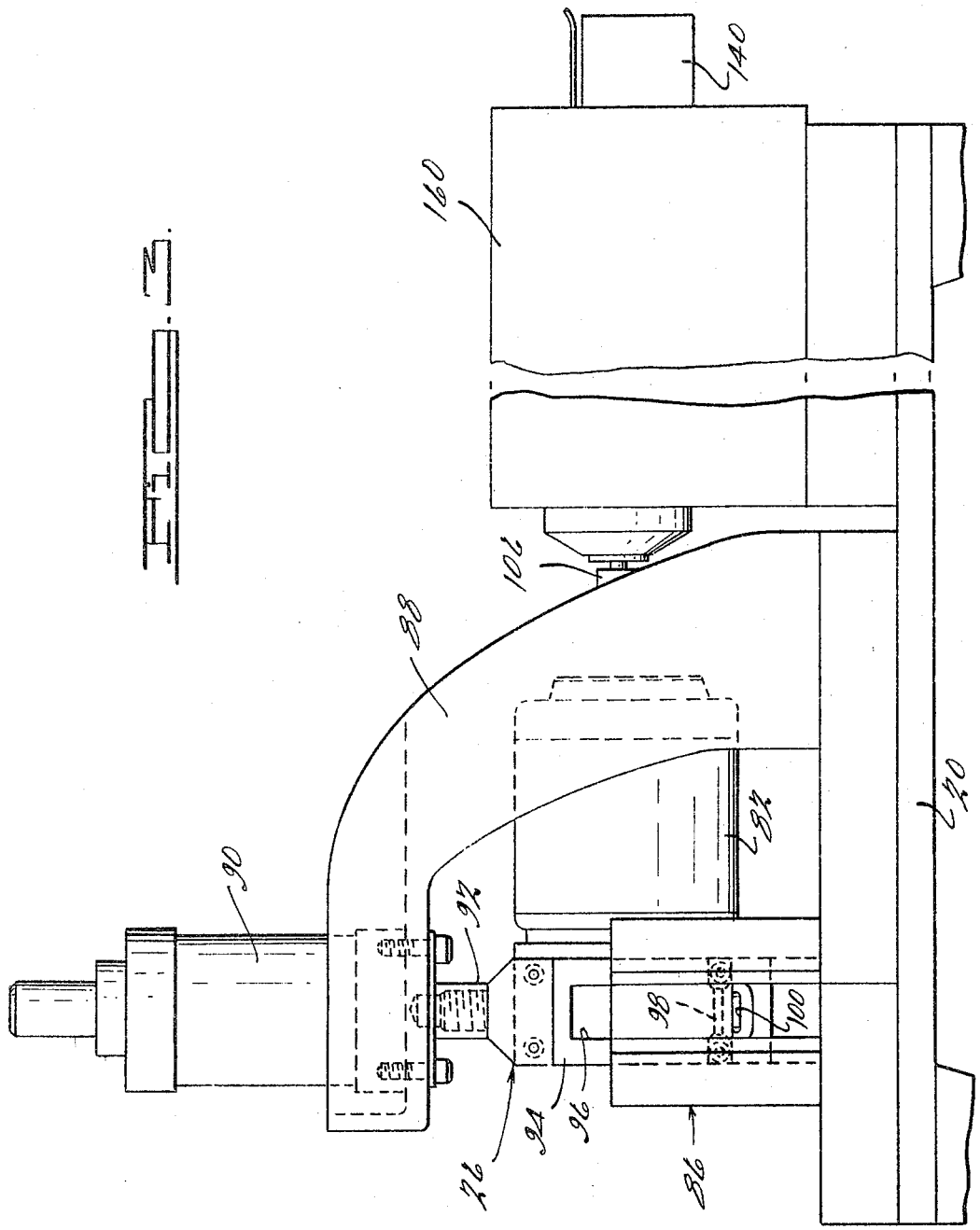

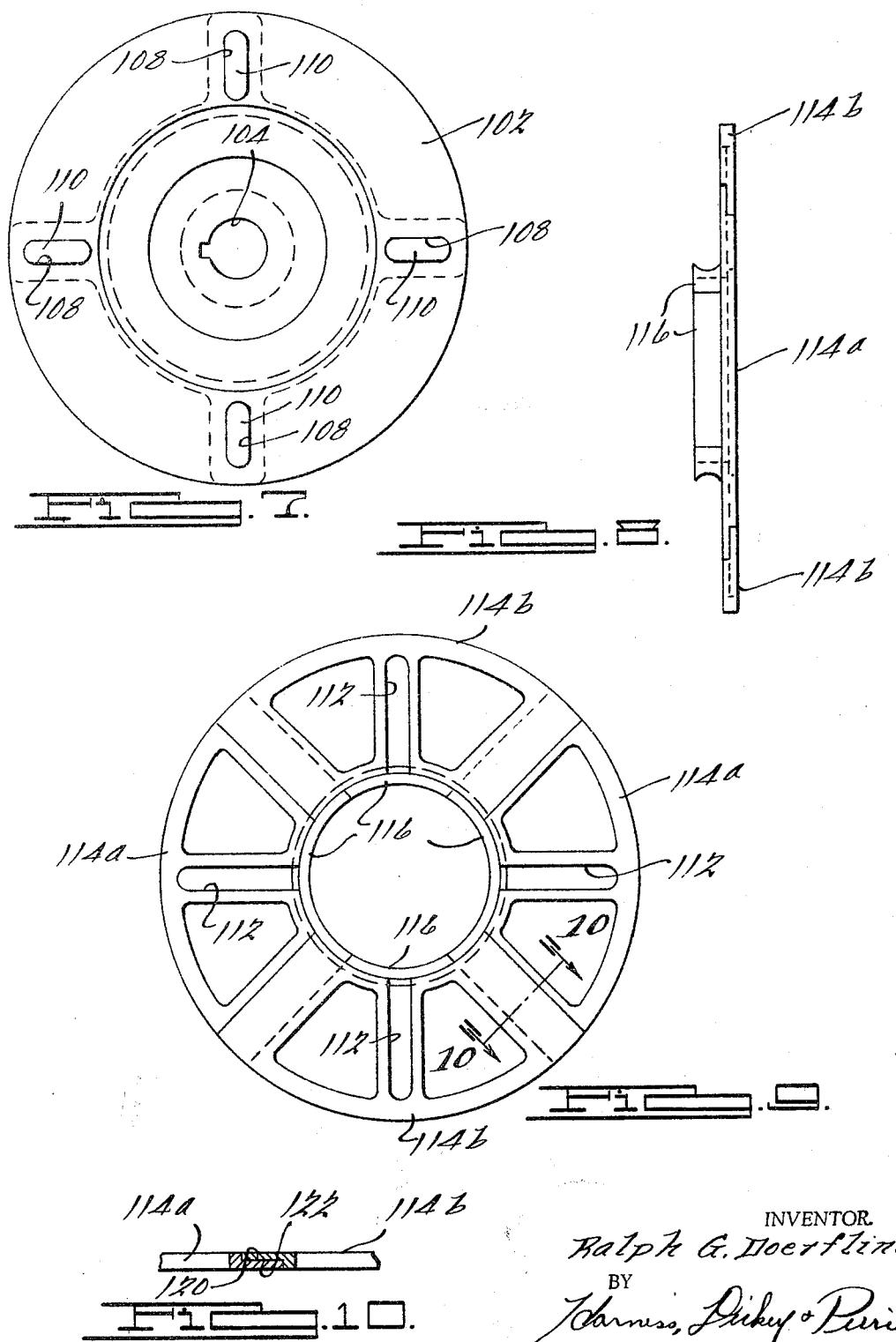

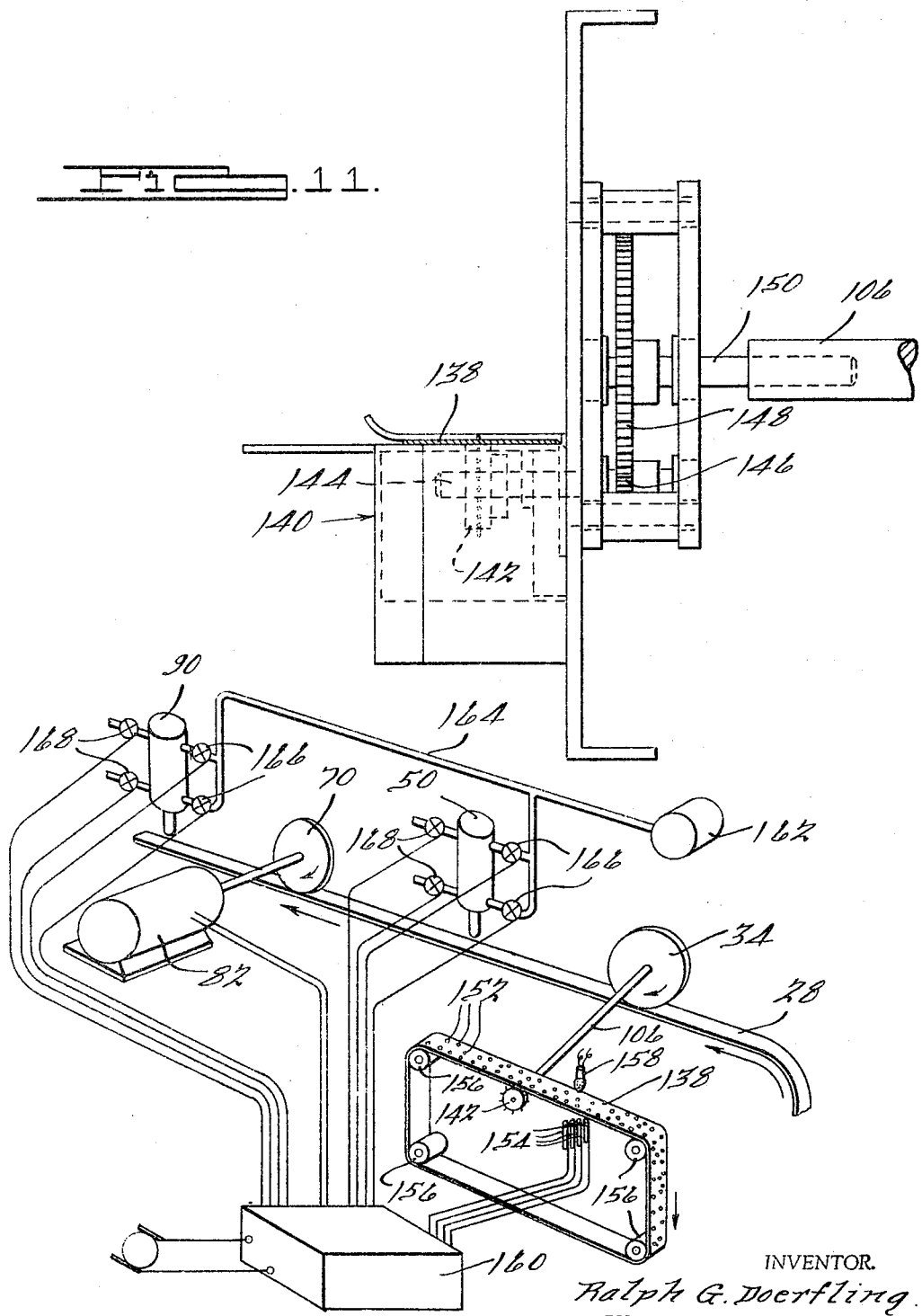

United States Patent Office 3,263,884
Patented August 2, 1966

3,263,884
STRIP PROCESSING MACHINE
Ralph G. Doerfling, Walled Lake, Mich., assignor to Detroit Gasket and Manufacturing Company, New York, N.Y., a corporation of Delaware
Filed June 29, 1964, Ser. No. 378,705
8 Claims. (Cl. 226—9)

The present invention broadly relates to a machine which is adapted to feed a continuous strip material to a series of operating stations, and more particularly to a machine for performing preselected work operations on a continuous strip fed therethrough including a notching, perforating and/or deforming of the strip at preselected intervals as well as cutting the strip into preselected lengths.

In the manufacture of parts or subassemblies which are of an elongated configuration, it is usually desirable to fabricate such parts from a continuous strip of material. Fabrication from a continuous strip is particularly advantageous when a number of work operations must be performed on each individual part cut from the continuous strip. In machines of the general type heretofore known adapted for processing continuous strip material, it has generally been necessary to provide a machine bed of a length corresponding to the length of the part cut from the continuous strip. Additionally, it has been necessary to position tools at various locations along the machine bed to effect a simultaneous work operation on the strip segment positioned along the machine bed.

In accordance with machines of the types heretofore known, a great deal of tool setup time and machine setup time is required which detracts from the flexibility and versatility of the machine for processing parts varying in their length and the types and number of work operations to be performed thereon. Additionally, machines of the types heretofore known of necessity are relatively large, cumbersome and constitute a substantial investment in equipment. There has accordingly been a heretofore unfilled need for a strip processing machine which is automatically operable to perform a preselected series of work operations on a continuous strip at preselected intervals therealong in accordance with an automatic programmed sequence and thereafter sever the strip into sections of preselected lengths.

It is accordingly a principal object of the present invention to provide an improved strip processing machine which overcomes the problems and disadvantages of similar type apparatus heretofore known.

Another object of the present invention is to provide an improved strip processing machine which is of relatively compact size and which is extremely versatile and flexible in operation enabling quick and simple changeover to alternate operating cycles and fabrication of strip sections of different lengths as may be desired.

Still another object of the present invention is to provide an improved strip processing machine incorporating means disposed in direct contact with the strip which is operative to selectively energize one or a multitude of tools positioned along the path of travel of the strip effecting thereby the performance of work operations on the strip at preselected intervals therealong.

A further object of the present invention is to provide an improved strip processing machine which can be programmed to provide for any one of a variety of automatic work performing sequences on a continuous strip passing therethrough and which provides for a high degree of accuracy in the location of the work operations performed at preselected intervals along the length of the strip section.

A still further object of the present invention is to provide an improved strip processing machine which is readily adjustable to compensate for variations in the elongation characteristics of the strip material being processed to assure accurate registration of the work operations at preselected intervals along the strip.

Yet still another object of the present invention is to provide an improved strip processing machine which is of compact size, of durable and versatile operation, of simple and economical manufacture and of reliable and simple control.

The foregoing and other advantages of the present invention are achieved by providing a strip processing machine including guide means through which a continuous strip material is fed along which one or a plurality of work-performing tools are positioned and are selectively actuable in response to the travel of the strip therealong to perform a preselected work operation. Advancement of the continuous strip is achieved by a drive means disposed in operative engagement with the strip which is selectively deenergizable effecting a momentary stoppage of the movement of the strip to enable a work operation to be performed thereon. The travel of the strip through the guide means is accurately sensed by means of a slave wheel disposed in driven relationship with the strip which in turn is drivingly coupled to a programming controller which is operative to control energization and deenergization of the drive means and actuation of the several work-performing tools in response to the travel of the strip.

Other objects, features and advantages of the present invention will become apparent from the subsequent description and the appended claims, taken in conjunction with the accompanying drawings, in which:

FIGURE 1 is a side elevational view of a strip processing machine incorporating the preferred embodiments of the present invention;

FIG. 2 is a plan view of the strip processing machine as shown in FIGURE 1;

FIG. 3 is an end elevational view of the strip processing machine shown in FIGURES 1 and 2;

FIG. 4 is a perspective exploded view of a typical notching die and cutter employed in the strip processing machine illustrated in FIGURES 1–3;

FIG. 5 is a perspective view of a cutoff blade adapted to be used for severing the continuous strip into sections of a preselected length;

FIG. 6 is a horizontal transverse sectional view through the slave wheel as illustrated in FIGURE 1 and taken along the line 6—6 thereof;

FIG. 7 is an end elevational view of the hub section of the slave wheel illustrated in FIGURE 6;

FIGURE 8 is a side elevational view of the expandable segments of the slave wheel illustrated in FIGURE 6;

FIG. 9 is a plan view of the assembled expandable segments illustrated in FIGURE 8;

FIG. 10 is a fragmentary sectional view illustrating the overlying relationship between adjacent ones of the expandable segments shown in FIGURE 9 and taken along the line 10—10 thereof;

FIG. 11 is a fragmentary side elevational view of the programming device drivingly coupled to the slave wheel; and FIG. 12 is a schematic perspective view of the relationship between the operative components of the strip processing machine as controlled by a perforated tape programming device.

Referring now in detail to the drawings and as may be best seen in FIGURES 1–3, a typical strip processing machine constructed in accordance with the preferred embodiments of the present invention comprises a base 20 on which the several machine components are securely fastened for receiving a continuous strip which may suitably be supplied from a supply reel 22. In the exemplary embodiment shown, two work-performing dies or tools designated 24 and 26 are mounted on the machine base 20 in longitudinal spaced relationship which are independently and selectively actuable to perform a desired work operation on the continuous strip at selected intervals therealong. It will be appreciated that only one or more than two such tools can be employed consistent with the number of different types of work operations that are to be performed on each strip section. In the exemplary embodiment illustrated only two such tools are illustrated for the purposes of simplicity wherein the tool 24 performs a notching operation along one edge of the strip whereas the tool 26 employs a cutter for severing the strip into sections of a preselected length.

A suitable strip of material indicated at 28 is continuously unwound from the feed reel 22 and extends upwardly into the inlet or left hand side of the machine as viewed in FIGURE 1 and is horizontally supported and longitudinally guided by an arcuate guide shoe 30 which is formed with a slot or groove 32 of a width so as to guidably contact the side edges of the strip 28 passing therethrough. The strip 28 on passing from the outlet side of the arcuate guide shoe 30 passes between a slave wheel indicated at 34 which is positioned with the periphery thereof in driven relationship with the upper surface of the strip and a supporting roller 36 disposed therebelow. The supporting roller 36 is rotatably supported in a pivotally mounted bracket 38 which is vertically adjustable by means of a resiliently biased adjusting screw assembly 40 in order to adjustably position the periphery of the supporting roller relative to the periphery of the slave wheel a distance to assure intimate contact and positive driving of the slave wheel in response to the travel of the strip therebetween.

The strip upon passing beyond the bight portion of a supporting roller 36 and slave wheel 34 passes into a second guide shoe 42 which is formed with a longitudinally extending groove 44 for horizontally supporting and longitudinally guiding the movement of the strip into a die assembly 46 of the tool 24. The tool 24, as may be best seen in FIGURES 1 and 4 includes a C-shaped frame 4 on the upper end of which a double-acting fluid actuated cylinder 50 is mounted to the lower rod end of which a punch 52 is removably fastened and is reciprocable thereby in appropriate die grooves formed in the die assembly 46. The double-acting cylinder is preferably pneumatically actuated by high pressure air admitted to one of the ends thereof providing for rapid movement of the punch in a vertical direction relative to the horizontal disposition of the strip. The punch and die assembly is perhaps best illustrated in FIGURE 4 wherein the punch 52 is of a rectangular configuration incorporating an elongated aperture 54 extending centrally thereof and is provided with a transverse groove 56 in which a cutter 58 is adapted to be removably received. The cutter 58 as illustrated in FIGURE 4 is adapted to be securely fastened in the transverse groove 56 by means of screws 60 and is formed with a triangular projection 62 which is adapted to project beyond the face of the punch 52. The triangular projection is adapted to notch the edge of the strip in response to reciprocation of the punch 52 whereupon the projection 62 passes through a correspondingly shaped notch 64 in a die plate 66 removably mounted in the die assembly 46. In the exemplary construction shown, the punch and die notching assembly of the tool 24 is operative to effect a notching of the strip during both the downward and in the upward reciprocating travel of the punch.

On passing from the die assembly 46 of the tool 24, the strip 28 passes through a guide shoe 68 in which it is horizontally supported and longitudinally guided into the bight portion of a driving wheel 70 and a supporting roller 72 disposed therebelow. The supporting roller 72 is similarly pivotally supported on a bracket 74 and is vertically adjustable by means of a resiliently biased adjusting screw assembly 76 to provide the requisite clearance relationship between the peripheral surfaces of the driving wheel and supporting roller. The periphery of the driving wheel 70 is selected so as to provide a proper frictional engagement with the upper surface of the strip to assure positive driving thereof and avoiding any slippage therebetween. Strip materials, for example, which are of a hard dense construction and have smooth face surfaces require that the periphery of the driving wheel 70 be of a high frictional material such as rubber, for example, to avoid any relative slippage therebetween. On the other hand, strip materials which are relatively soft such as plastic strip material, can be accurately advanced by the driving wheel 70 which is provided with a plurality of teeth indicated generally at 78 as typified by a circular saw blade extending completely around the periphery thereof.

The driving wheel 70 is mounted on a shaft 80 which is drivingly coupled to a motor 82 mounted on the machine base 20. The motor 82 may be fluid actuated or electrically energized and preferably consists of an electric permanent magnet synchronous motor possessing instant start and stop characteristics and can be readily controlled in speed of rotation in accordance with the frequency of alternating current supplied thereto. An electric synchronous motor of this type which has been found particularly satisfactory is commercially designated as Slo-Syn available from the Superior Electric Company, Bristol, Connecticut. The motor preferably is controlled so as to be operable at a substantially constant preselected maximum speed as well as a relatively slower intermediate speed which is used during the acceleration of the strip from a stationary position and also during deceleration of the strip from the full speed position to a stationary stop. This can be simply achieved, for example, by selectively controlling the frequency of alternating current supplied to the synchronous motor to achieve the desired maximum and intermediate speeds. The intermediate speed is also employed when work operations are to be performed at relatively close intervals along the strip in which case the strip is advanced at the intermediate speed between such intervals avoiding any high speed inertia forces which would tend to cause an overtravel of the strip beyond the preselected work-performing position.

On passing beyond the bight portion of the driving wheel 70 and supporting rollers 72, the strip 28 passes through a guide shoe 84 in which it is horizontally and guidably supported for movement into alignment with a cutoff die assembly 86 of the tool 26. The tool 26, as best illustrated in FIGURES 1–3 and 5, similarly comprises a C-shaped frame 88 mounted on the machine base 20 on the upper portion of which a double-acting fluid actuated cylinder 90 is mounted. To the lower end of a piston rod 92 of the cylinder 90 a punch 94 is removably secured and is reciprocable thereby in a vertical direction and substantially perpendicular to the path of travel of the strip. The punch 94 is similar to the punch 52 illustrated in FIGURE 4 but is mounted with the major dimension thereof positioned transversely of the direction of travel of the strip. The punch 94 is similarly provided with an elongated aperture 96 in which a cutoff blade 98, as best seen in FIGURE 5, is removably mounted for severing the strip in sections of a preselected length in response to the actuation of the cylinder 90. The strip is guided by the cutoff die assembly 86 to pass through the elongated aperture 96 in the punch 94 and the sections of the strip severed pass outwardly through a guide aperture 100 in the die assembly. In the specific construction shown, the cutoff die assembly incorporating the cutter blade 98 is operative to sever the strip in response to the downward as well as in response to the upward movement of the punch.

It will be appreciated from the description of the strip processing machine as hereinbefore set forth, that the actuation of the punches of the tools 24 and 26 are achieved in response to the travel of the strip 28 through the machine as directly measured in accordance with the rotation of the slave wheel 34 disposed in driven relationship with the upper surface of the strip. The longitudinal travel of the strip 28 is in turn accomplished by the driving coaction of the periphery of the driving wheel 70 in response to the selective energization of the driving motor 82. The resultant tensioning of the strip between the driving wheel and the slave wheel has a tendency to effect an elongation of the strip between these points and depending on the nature of the strip material being processed, the degree of stretch may be sufficient to cause inaccuracies in the location of the work operation or notch, for example, imparted to the strip. Since the elongation characteristics of any specific material can be readily calculated or determined by trial, accurate processing of the strip material can be achieved even when made of relatively resilient material having significant stretch characteristics. This is achieved in accordance with the adjustable characteristics of the slave wheel whereby the peripheral length or circumference thereof disposed in driven relationship with the upper surface of the strip can be varied to adjust for the stretch characteristics of the strip assuring actuation of the tool 24 at the appropriate instant and compensating for any elongation in the strip which may have occurred such that proper registration of the work operated along the length of the strip section is attained after the tensioning forces on the strip are relieved.

The novel construction of the slave wheel is best illustrated in FIGURES 6–10. As shown in these figures, the slave wheel 34 comprises a hub 102 which is formed with a bore 104 which is adapted to slidably receive a shaft 106 (FIGURE 2) which in turn is drivingly coupled to a suitable automatic programming device. The hub 102, as best seen in FIGURE 7, is formed with four elongated grooves 108 which are disposed in a radially oriented direction at intervals of 90° from each other. A suitable key 110 is removably positioned in each of the grooves 108 and projects beyond the face of the hub 102. The projecting portion of each key 110 is adapted to be positioned in sliding relationship in a groove 112 in each of four expandable sections 114a, 114b. The expandable sections 114a, 114b as best seen in FIGURE 9, when assembled, provide a circular periphery which may be suitably serrated, knurled or otherwise provided with a surface that will not slip relative to the strip material passing in driving relationship relative thereto.

In the exemplary embodiment shown two pairs of expandable sections 114a, 114b are employed each providing an arc slightly in excess of 90°. The sections 114a, 114b are radially movable inwardly and outwardly in guided relationship along the keys 110 to provide the requisite circumference consistent with the elongation characteristics of the strip being processed. Each of the expandable sections, as best seen in FIGURES 8 and 9, are provided with arcuate flanges 116 along the inner portions which in the assembled condition of the sections forms a grooved arcuate rim around which a continuous coil spring 118 (FIGURE 6) is adapted to be positioned biasing each of the sections inwardly to a retracted position. In order to provide continuity of the peripheral edge of the expandable sections 114a, 114b, the side edges of adjacent sections 114a, 114b are slotted providing a relative overlap. As best seen in FIGURES 9 and 10, the section 114a is provided with a groove 120 extending substantially parallel along each of the radial side edges thereof while the sections 114b are provided with grooves 122 along their radial side edges which slidably interfit each other as indicated in FIGURE 10.

The relative radial disposition of the several expandable sections is controlled by a conical ring 124 having a conically shaped peripheral surface which is adapted to be disposed in bearing relationship against the inner edges of the expandable sections 114a, 114b as best seen in FIGURE 6. The coaction of the conical ring 124 in response to axial movement thereof relative to the hub 102 effects relative outward movement of the expandable sections in opposition to the inward biasing force of the continuous coil spring 118. The appropriate axial disposition of the conical ring 124 is achieved by means of an adjusting knob 126 which is provided along its inner end with an annular groove 128 in which the conical ring 124 is seated. The knob 126 is formed with a threaded bore 130 extending axially therethrough which in turn is threadably engaged on a threaded shank portion 132 of the shaft 106. The knob 126 is locked in appropriate axial position by means of a locking hub 134 threadably engaged on a threaded annular section 136 around an intermediate section of the knob. The locking hub 134 includes a radial flange which is adapted to be positioned in overlying clamping relationship against the one side surface of the expandable sections 114a, 114b, in a manner as shown in FIGURE 6, retaining them in appropriate perpendicular relationship relative to the axis of rotation of the slave wheel. The binding coaction between the locking hub 134 and the expandable sections also prevents inadvertent drift thereof from the preadjusted position as established by the appropriate axial positioning of the conical ring 124.

Since the tensioning imparted to the strip 28 between the slave wheel and driven wheel is relatively small and since the elongation of the strip is also relatively small but significant if accurate registration is desired, the degree of adjustment of the expandable sections in order to change the circumference of the slave wheel to compensate for the stretch is small so that no perceptible out-of-roundness of the wheel is attained between the extreme adjusted positions of the expandable sections. By virtue of the adjustment provided, however, an extremely accurate correlation can be obtained between the travel of the strip and the rotation of the slave wheel which through the shaft 106 is drivingly coupled to a suitable programming device which similarly is advanced in direct proportion to the advancing travel of the strip.

Any one of a variety of suitable programming devices can be satisfactorily employed of which tape readers are preferred. The specific type of tape may vary and can include magnetic type tapes having magnetized indicia positioned at selected intervals therealong which upon passing magnetic sensing means are operative to effect selected energization and deenergization of the drive motor and selected actuation of the tools to perform the desired work operation on the strip. Alternatively, the tape may be provided with printed indicia thereon which are adapted to be sensed by suitable optical sensing means disposed in the path of travel of the tape. In accordance with the exemplary embodiment as illustrated in the drawings, a perforated tape is employed which is provided with perforations along the length thereof at selected intervals which may be suitably scanned by optical sensing means responsive to an alignment of a perforation in the tape with a light source disposed at the opposite side of the tape. Alternatively, the tape may of a suitable electrically nonconductive material with contacts positioned against both faces thereof which are placed in electrical contact in response to the alignment of a perforation between the contacts. While tape-type programming devices are preferred, programming devices such as, for example, a disc having cams at selected intervals therealong which are operative in response to rotation of the disc to actuate suitable limit or micro switches can also be satisfactorily employed.

In the exemplary embodiment as illustrated in FIGURE 11, a continuous tape 138 is advanced through a tape head assembly 140 by means of a sprocket wheel 142 having a plurality of projections around the periphery thereof which are adapted to be disposed in driving relationship in a plurality of correspondingly spaced perforations in the tape 138. The sprocket wheel 142 is mounted on a shaft 144 which in turn is provided with a gear 146 at the opposite end thereof which is disposed in constant meshing relationship with a drive gear 148. The drive gear 148 is connected to a shaft 150 which in turn is coupled to the driving shaft 106 connected to the slave wheel 34. Accordingly, the advancement of the tape 138 is achieved in direct relationship to advancement of the strip through the processing machine. The tape 138 may be of a comparatively long length including sections bearing different indicia therealong such that variations in the type of work operations and in the length of the sections of strip material processed through the machine will occur as desired. Alternatively, the tape may be in a continuous belt-like form providing a cyclical operation of the machine whereupon consecutive strip sections are identical. When a continuous tape is employed the speed of travel thereof can be mechanically coordinated so as to correspond identically to the speed of travel and linear distance of movement of the strip passing through the processing machine. Alternatively, through a suitable gear reduction of the drive gear 148 and driven gear 146 as well as the sprocket wheel 142, a preselected ratio can be established between the travel of the tape relative to the travel of the strip.

The operation of the machine will now be described with particular reference to the diagrammatic arrangement of the machine as illustrated in FIGURE 12. As shown, the continuous tape 138 is provided with a plurality of perforations 152 positioned at various longitudinal increments therealong and at appropriate transversely located positions so as to be sensed by either one of four sensing devices indicated at 154. In the exemplary embodiment shown, the tape 138 is in the form of a continuous belt and extends around four idler rolls 156 and is driven by the sprocket wheel 142 drivingly coupled to the slave wheel 34 by means of the shaft 106. A suitable bulb or light source 158 is positioned above the tape in alignment with the sensing devices 154 therebelow and is operative in response to movement of the tape such that a perforation 152 thereon on coming into alignment with one of the sensing devices sends a signal to a control system indicated at 160 which in turn effects appropriate operation of the several tools and drive motor of the processing machine. The number of sensing devices 154 and the number of channels of perforations in the tape will vary in accordance with the number of operating units embodied in the machine. One channel, for example, is required for effecting energization of the drive motor 82 to an intermediate speed while a second channel is required to effect energization of the motor to higher speed to effect more rapid advancement of the strip through the machine. Still another channel is required to effect energization of the tool 26 while a separate channel is required for effecting energization of the tool 24. The relative positioning of the perforations on each of these channels provides for an actuation of the tools and an acceleration, deceleration and stoppage of the movement of the tape to enable a work operation to be performed at a preselected location along the length of the strip.

The control system 160 to which the impulses from the sensing devices 154 are transmitted and which in turn effect selective energization and deenergization of the several operating components may be of any of the types well known in the art. A commercially available tape reader and control system which when modified in accordance with the teachings of the present invention provides for satisfactory operation is available from Digitronics Corporation, Albertson, N.Y., and is designated as Model 2500.

The actuation of the double-acting cylinders 50 and 90 of the tools 24 and 26, respectively, is achieved by a suitable pressurized fluid source such as air supplied from a pump or compressor 162 through a supply conduit 164 to solenoid actuated inlet valves 166. The opposite ends of each of the cylinders 50 and 90 are vented and are provided with solenoid actuated vent valves 168. The valves 166 and 168 are selectively actuable by the control system 160 in response to the disposition of the perforations on the tape to allow pressurized air to pass into one end of the cylinder and to be vented from the opposite end thereof effecting reciprocation of the punch and performing an operation on the strip. During the next operation of the double-acting cylinder, the other vent valve is opened and the other inlet valve is opened with the remaining two valves closed, effecting movement of the punch in the opposite direction. Alternatively, a suitable slide valve can be employed for providing the requisite operation. The punching and cutting operation of the strip is achieved when the strip is stationary relative to the cutting dies.

In operation, the continuous strip 28 is fed into the machine so that the driving wheel 70 is disposed in driving relationship against the upper surface thereof. The central control system is thereafter energized whereupon the drive motor 82 is energized, effecting movement of the strip by the drive wheel with a corresponding rotation of the slave wheel and advancement of the tape. When notching or work intervals on the strip are relatively far apart, the drive motor is initially accelerated to an intermediate speed and subsequently to a second or even a third higher running speed to effect rapid advancement of the strip through the machine. These speeds are controlled by appropriate perforations positioned in the respective channels of the tape. As the tape is advanced and a point thereof at which a work operation is to be performed approaches the tool 24, the drive motor is first initially decelerated to the intermediate speed and thereafter is completely deenergized, effecting stoppage of the strip. At the same time a perforation on the tape in the channel controlling the operation of the tool 24 is sensed by an appropriate sensing device 154, effecting actuation of the cylinder 50 and performing the appropriate operation such as a notching operation on the strip. After a preselected dwell period, which is suitably established by an electronic timer such as a capacitor type well known in the art, the drive motor is again energized to an intermediate speed, effecting further advancement of the strip and a corresponding movement of the perforated tape in response to rotation of the slave wheel. Additional notching operations may similarly be performed along the strip at preselected intervals in accordance with the spacing of the perforations in the appropriate channel of the tape. A severing of the strip into a section of a preselected length is achieved in response to a perforation in the tape becoming aligned with the appropriate sensing device which effects actuation of the cylinder 90 of the tool 26 just prior to which the drive motor is deenergized, halting the strip during the cutting operation. At the completion of the cutting operation and after a preselected dwell period, the motor is again energized, effecting further advancement of the strip through the machine.

It will be apparent from the foregoing that any one of a variety of work operations can be accurately performed on the strip at accurately spaced intervals consistent with the programming provided on the programming tape as sensed by the slave wheel in driving relationship with the strip material being processed.

A machine of the type constructed in accordance with the embodiments as herein disclosed has been found particularly suitable for processing a vinyl plastic seaming lace of the type employed in the manufacture of upholstery for furniture and automobile seats whereupon the seaming lace is automatically cut to preselected lengths and is provided with notches along one edge thereof at selected intervals to facilitate a bending of the seaming lace around corners in addition to registration notches at selected intervals facilitating alignment of the seaming lace with corresponding registration notches in the fabric or sheet materials to be sewed thereto. In accordance with the strip processing machine, completely automatic and accurate fabrication of strips of seaming lace can be made wherein the drive motor provided advancement of the strip at an intermediate speed of about 50 feet per minute and a full operating speed of about 140 feet per minute. Dwell periods necessary to effect a notching or cutting of the strip of only 100 milliseconds are required, providing thereby an almost continuous process. It will also be appreciated that by simply changing the programming tape on the tape head, different lengths of strip material provided with work operations at different locations therealong can readily be achieved without any substantial down-time of the apparatus. Additionally, the punch and die retainers can be readily interchanged so as to provide variations in the specific work operation performed on the strip.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A machine for automatically performing work operations on a strip comprising a frame, guide means on said frame for guidably and movably supporting a work strip, drive means operatively connected to said strip and selectively energizable for advancing said strip along said guide means, a tool positioned along said guide means adjacent to the path of travel of said strip, means for selectively actuating said tool for performing a work operation on said strip, rotatable means disposed with the periphery thereof in contact with and in driven relationship with said strip and movable in response to advancement of said strip along said guide means, and control means drivingly coupled to said rotatable means and operable to selectively energize and deenergize said drive means and to actuate said tool in response to preselected advancements of said strip.

2. A machine for automatically performing work operations on a strip comprising a frame, guide means on said frame for guidably and movably supporting a work strip, drive means operatively connected to said strip and selectively energizable for advancing said strip along said guide means, a plurality of tools positioned along said guide means at longitudinally spaced increments adjacent to the path of travel of said strip, means for selectively actuating said tools for performing work operations on said strip, rotatable means disposed with the periphery thereof in contact with and in driven relationship with said strip and movable in response to advancement of said strip along said guide means, and control means drivingly coupled to said rotatable means and operable to selectively energize and deenergize said drive means and to independently actuate said tools in response to preselected advancements of said strip.

3. A machine for automatically performing work operations on a continuous strip comprising a frame, guide means on said frame for guidably and movably supporting a work strip, drive means operatively connected to said strip and selectively energizable for advancing said strip along said guide means, a tool positioned along said guide means adjacent to the path of travel of said strip, means for selectively actuating said tool for performing a work operation on said strip, a slave wheel disposed in driven relationship with said strip and rotatable in response to advancement of said strip along said guide means, a shaft drivingly coupled to said slave wheel, and control means drivingly coupled to said shaft and operable to selectively energize and deenergize said drive means and to actuate said tool in response to preselected advancements of said strip.

4. A machine for automatically performing work operations on a strip comprising a frame, guide means on said frame for guidably and movably supporting a work strip, drive means operatively connected to said strip and selectively energizable for advancing said strip along said guide means, a tool positioned along said guide means adjacent to the path of travel of said strip, means for selectively actuating said tool for performing a work operation on said strip, a slave wheel disposed in driven relationship with said strip and rotatable in response to advancement of said strip along said guide means, a shaft connected to said slave wheel, and control means drivingly coupled to said shaft including a tape having indicia thereon and means for sensing said indicia for selectively energizing and deenergizing said drive means and for actuating said tool in response to the movement of said tape responsive to the travel of said strip.

5. A machine for automatically performing work operations on a strip comprising a frame, guide means on said frame for guidably and movably supporting a work strip, drive means operatively connected to said strip and selectively energizable for advancing said strip along said guide means, a tool positioned along said guide means adjacent to the path of travel of said strip, means for selectively actuating said tool for performing a work operation on said strip, a slave wheel disposed in contact and driven relationship with said strip and rotatable in response to advancement of said strip along said guide means, a shaft coupled to said slave wheel, a programming tape incorporating indicia thereon drivingly coupled to said shaft and movable thereby in response to rotation of said slave wheel, control means including sensing means for sensing the passage of said indicia on said programming tape and operable to selectively energize and deenergize said drive means and to actuate said tool in response to preselected advancements of said strip.

6. A machine for automatically performing work operations on a strip comprising a frame, guide means on said frame for guidably and movably supporting a work strip, drive means operatively connected to said strip and selectively energizable for advancing said strip along said guide means, a plurality of tools positioned at longitudinally spaced increments along said guide means adjacent to the path of travel of said strip, means for selectively and independently actuating each of said tools for performing work operations on said strip, a slave wheel disposed in contact and in driven relationship with said strip and rotatable in response to advancement of said strip along said guide means, said slave wheel including adjusting means for selectively varying the circumferential length thereof disposed in driven relationship with said strip, a shaft drivingly coupled to said slave wheel, and control means drivingly coupled to said shaft and operable to selectively energize and deenergize said drive means and to actuate said tool in response to preselected advancements of said strip.

7. A machine for automatically performing work operations on a strip comprising a frame, guide means on said frame for guidably and movably supporting said work strip, a drive wheel disposed in driving relationship with said strip, motor means selectively energizable for rotating said drive wheel and advancing said strip along said guide means, a tool positioned along said guide means adjacent to the path of travel of said strip, means for selectively actuating said tool for performing a work operation on said strip, a slave wheel disposed with the periphery thereof in driven relationship with said strip and rotatable in response to advancement of said strip along said guide means, said slave wheel including a plurality of arcuate segments mounted for radial movement relative to the axis of rotation of said slave wheel, means for adjustably positioning said arcuate segments for adjusting the circumferential length of said slave wheel, a shaft drivingly coupled to said slave wheel, and control means drivingly coupled to said shaft and operable to selectively energize and deenergize said motor means and to actuate said tool in response to preselected advancements of said strip.

8. A machine for automatically performing work operations on a strip comprising a frame, guide means on said frame for guidably and movably supporting a work strip, a drive wheel disposed with the periphery thereof in driving relationship with said strip, motor means for rotating said drive wheel, a plurality of tools positioned in longitudinally spaced increments along said guide means adjacent to the path of travel of said strip, means for independently and selectively actuating each said tools for performing work operations on said strip, a slave wheel positioned with the periphery thereof disposed in driven relationship with said strip and rotatable in response to advancement of said strip along said guide means, said slave wheel including a plurality of arcuate segments defining the periphery thereof which are radially movable to vary the peripheral length of said slave wheel in contact with said strip, adjusting means for adjustably positioning the radial disposition of said arcuate segments, a shaft drivingly coupled to said slave wheel, and control means drivingly coupled to said shaft and operable in response to rotation of said slave wheel to selectively energize and deenergize said motor means and to selectively and independently actuate each said tool in response to preselected advancements of said strip.

References Cited by the Examiner

UNITED STATES PATENTS

| | | | |
|---|---|---|---|
| 1,508,673 | 9/1924 | Bingham | 226—175 X |
| 2,531,876 | 11/1950 | Fitch | 197—20 |
| 2,884,852 | 5/1959 | Saltz | 226—9 X |
| 2,999,295 | 9/1961 | Manning | 226—30 X |
| 3,148,814 | 9/1964 | Studer | 226—9 X |

M. HENSON WOOD, JR., *Primary Examiner.*

J. ERLICH, *Assistant Examiner.*